(12) United States Patent
Lu et al.

(10) Patent No.: US 12,192,987 B2
(45) Date of Patent: Jan. 7, 2025

(54) INFORMATION TRANSMISSION METHOD AND TERMINAL APPARATUS

(71) Applicant: GUANGDONG OPPO MOBILE TELECOMMUNICATIONS CORP., LTD., Guangdong (CN)

(72) Inventors: Qianxi Lu, Guangdong (CN); Zhenshan Zhao, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 375 days.

(21) Appl. No.: 17/537,380

(22) Filed: Nov. 29, 2021

(65) Prior Publication Data

US 2022/0086871 A1    Mar. 17, 2022

Related U.S. Application Data

(63) Continuation of application No. PCT/CN2019/089134, filed on May 29, 2019.

(51) Int. Cl.
*H04W 72/1263* (2023.01)
*H04W 72/21* (2023.01)
(Continued)

(52) U.S. Cl.
CPC ....... *H04W 72/1263* (2013.01); *H04W 72/21* (2023.01); *H04W 72/542* (2023.01); *H04W 72/566* (2023.01)

(58) Field of Classification Search
CPC ............. H04W 72/1263; H04W 72/21; H04W 72/542; H04W 72/566; H04W 72/569;
(Continued)

(56) References Cited

U.S. PATENT DOCUMENTS

| 10,165,580 B2 | 12/2018 | Lee et al. |
| 2017/0290028 A1 | 10/2017 | Lee et al. |

(Continued)

FOREIGN PATENT DOCUMENTS

| CN | 105163346 A | 12/2015 |
| CN | 108810975 A | 11/2018 |

(Continued)

OTHER PUBLICATIONS

Huawei et al: "Further discussion on SR configuration and procedure for NR SL Mode-1", 3GPP Draft; R2-1907450; 3GPP TSG-RAN WG2 #106; Reno, USA; May 13-17, 2019. 9 pages.

(Continued)

*Primary Examiner* — Michael K Phillips
(74) *Attorney, Agent, or Firm* — PERKINS COIE LLP

(57) ABSTRACT

Disclosed are an information transmission method, a terminal apparatus, a chip, a computer readable storage medium, a computer program product and a computer program. The method comprises: if a sidelink (SL) Buffer Status Report (BSR) is triggered by an event, and if a first condition is met, executing at least one of the following: triggering a scheduling request (SR); transmitting a first uplink channel comprising the SR; packeting a BSR, wherein the BSR at least comprises the SL BSR; or performing transmission of a second uplink channel comprising the packeted BSR.

10 Claims, 4 Drawing Sheets

---

If an SL BSR is triggered by an event, and if a first condition is met, at least one of the following operations is performed:

an SR is triggered;

a first uplink channel including the SR is transmitted;

BSR packeting is performed, wherein the BSR at least includes the SL BSR;

or, a second uplink channel including the packeted BSR is transmitted.

21

(51) Int. Cl.
   *H04W 72/542* (2023.01)
   *H04W 72/566* (2023.01)
(58) Field of Classification Search
   CPC ......... H04W 28/0278; H04W 28/0858; H04W 28/0967; H04W 76/14; H04W 24/10; H04W 4/40; H04W 72/20; H04L 5/0053
   See application file for complete search history.

(56) References Cited

U.S. PATENT DOCUMENTS

| | | | | |
|---|---|---|---|---|
| 2018/0263026 | A1* | 9/2018 | Loehr | H04W 72/02 |
| 2018/0317123 | A1 | 11/2018 | Chen et al. | |
| 2019/0357245 | A1 | 11/2019 | Kuang | |
| 2021/0298040 | A1* | 9/2021 | Zhao | H04W 76/14 |
| 2021/0392542 | A1 | 12/2021 | Chen et al. | |
| 2022/0007230 | A1 | 1/2022 | Chen et al. | |
| 2022/0183031 | A1* | 6/2022 | Zhang | H04W 72/1268 |
| 2022/0183049 | A1* | 6/2022 | Lee | H04W 76/20 |
| 2022/0201731 | A1* | 6/2022 | Lee | H04W 72/569 |
| 2022/0210801 | A1* | 6/2022 | Xu | H04W 72/21 |

FOREIGN PATENT DOCUMENTS

| | | |
|---|---|---|
| CN | 108811157 A | 11/2018 |
| CN | 109392147 A | 2/2019 |
| CN | 109587806 A | 4/2019 |
| CN | 109716838 A | 5/2019 |
| EP | 3503657 A1 | 6/2019 |
| JP | 2018-186506 A | 11/2018 |
| RU | 2543955 C2 | 3/2015 |
| WO | 2016068454 A1 | 5/2016 |
| WO | 2018126839 A1 | 7/2018 |
| WO | 2019062558 A1 | 4/2019 |

OTHER PUBLICATIONS

Ericsson: "gNB-Scheduled Resource Allocation for Sidelink", 3GPP Draft; R2-1907354; 3GPP TSG-RAN WG2 #106; Reno, USA; May 13-17, 2019. 4 pages.
Supplementary European Search Report in the European application No. 19930304.1, mailed on Apr. 26, 2022. 12 pages.
Office Action of the Indian application No. 202117055888, issued on May 26, 2022. 5 pages with English translation.
Written Opinion of the International Search Authority in the international application No. PCT/CN2019/089134, mailed on Feb. 26, 2020. 10 pages with English translation.
First Office Action of the Russian application No. 2021137365, issued on Aug. 18, 2022. 13 pages with English translation.
First Office Action of the European application No. 19930304.1, issued on Oct. 17, 2022. 8 pages.
Vivo, "Priority between SR and PUSCH", 3GPP TSG-RAN WG2 Meeting #105bis R2-1903591, Xi'an, China, Apr. 8-Apr. 12, 2019. 3 pages.
3GPP TS 36.331 V14.2.2, "3rd Generation Partnership Project; Technical Specification Group Radio Access Network; Evolved Universal Terrestrial Radio Access (E-UTRA); Radio Resource Control (RRC); Protocol specification (Release 14)", Technical Specification, (Apr. 2017). 721 pages.
First Office Action of the Chinese application No. 202111393624.0, issued on Jan. 4, 2023. 16 pages with English translation.
"Generation Partnership Project; Technical Specification Group Radio Access Network; Evolved Universal Terrestrial Radio Access (E-UTRA); Radio Link Control (RLC) protocol specification (Release 15)", 3GPP TS 36.322, vol. RAN WG2, No. V15.1.0, Jul. 5, 2018 (Jul. 5, 2018), pp. 1-45, XP051474775.
Second Office Action of the European application No. 19930304.1, issued on Apr. 13, 2023.
Sony, "Collision of SL SR and UL-SCH transmission for NR SL Mode 1", 3GPP TSG RAN WG2#106 R2-1907050, May 2, 2019.
MediaTek Inc., "Prioritization of UL and SL transmission", 3GPP TSG RAN WG2#106 R2-1906337, May 3, 2019.
First Office Action of the Japanese application No. 2021-570354, issued on Apr. 14, 2023.
Second Office Action of the Chinese application No. 202111393624.0, issued on Mar. 8, 2023.
Decision of Refusal of the Chinese application No. 202111393624.0, issued on May 16, 2023.
Title: "New SID: Study on NR V2X", 3GPP TSG RAN Meeting #80 RP-181429, La Jolla, USA, Jun. 1114, 2018, Source: Vodafone,,Document for: Approval,Agenda Item: 9.1.5.
International Search Report in the international application No. PCT/CN2019/089134, mailed on Feb. 26, 2020.
Written Opinion of the Singaporean application No. 11202113135U, issued on Jan. 17, 2024. 9 pages.
CATT, "Sidelink SR/BSR in Uu Interface", 3GPP TSG-RAN WG2 Meeting #105 R2-1900219, Athens, Greece, Feb. 25-Mar. 1, 2019, the whole document. 5 pages.
OPPO, "Discussion on MAC for NR-V2X", 3GPP TSG-RAN WG2 Meeting #105bis R2-1903216, Xi'an, China, Apr. 8-Apr. 12, 2019, the whole document. 7 pages.
Decision of Rejection of the Japanese application No. 2021-570354, issued on Mar. 8, 2024. 6 pages with English translation.
First Office Action of the Vietnamese application No. 1-2021-08223, issued on Mar. 28, 2024. 3 pages with English translation.
Supplementary European Search Report in the European application No. 24156490.5, mailed on Apr. 9, 2024. 11 pages.

* cited by examiner

If an SL BSR is triggered by an event, and if a first condition is met, at least one of the following operations is performed:
an SR is triggered;
a first uplink channel including the SR is transmitted;
BSR packeting is performed, wherein the BSR at least includes the SL BSR;
or,
a second uplink channel including the packeted BSR is transmitted.
FIG. 3
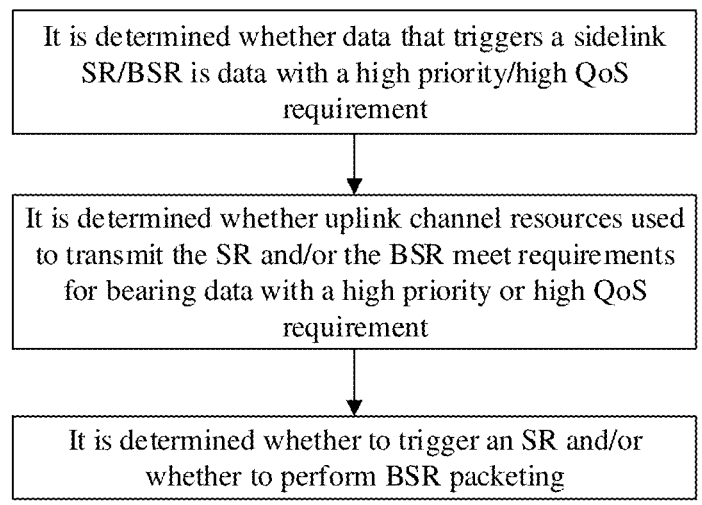
FIG. 4
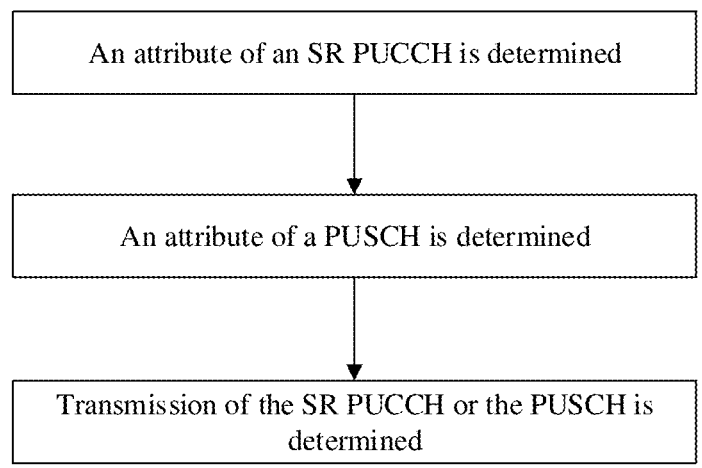
FIG. 5

INFORMATION TRANSMISSION METHOD AND TERMINAL APPARATUS

CROSS-REFERENCE TO RELATED APPLICATION

This is a continuation application of International Patent Application No. PCT/CN2019/089134 filed on May 29, 2019, the contents of which are hereby incorporated by reference in its entirety.

TECHNICAL FIELD

The disclosure relates to the technical field of information processing, and particularly to a method for information transmission, a terminal device, a chip, a computer-readable storage medium, a computer program product, and a computer program.

BACKGROUND

The Internet of Vehicles system is a Sidelink (SL) transmission technology based on Long Term Evaluation-Device to Device (LTE-D2D). In the 3rd Generation Partnership Project (3GPP) Rel-14, the Internet of Vehicles technology (V2X) is standardized, and two transmission modes are defined: a mode A and a mode B. In the mode A, transmission resources of a terminal are allocated by a base station, the terminal transmits data on a sidelink according to the resources allocated by the base station, and the base station may allocate single transmission resources for the terminal or semi-static transmission resources for the terminal. In the mode B, a vehicle-mounted terminal selects a resource in a resource pool for transmitting data. However, the existing Scheduling Request/Buffer Status Report (SR/BSR) mechanisms for the sidelink cannot meet the delay requirements.

SUMMARY

For solving the above technical problems, embodiments of the disclosure provide a method for information transmission, a terminal device, a chip, a computer-readable storage medium, a computer program product, and a computer program.

A first aspect provides a method for information transmission applied to a terminal device. The method includes the following operations.

If an SL BSR is triggered by an event, and if a first condition is met, at least one of the following operations is performed.

An SR is triggered.

A first uplink channel including the SR is transmitted.

BSR packeting is performed, with a BSR at least including the SL BSR.

A second uplink channel containing the packeted BSR is transmitted.

A second aspect provides a terminal device, including a processing unit.

The processing unit is configured to, if an SL BSR is triggered by an event, and if a first condition is met, perform at least one of the following: triggering an SR; transmitting a first uplink channel including the SR; performing BSR packeting, with a BSR at least including the SL BSR; or, transmitting a second uplink channel including the packeted BSR.

A third aspect provides a terminal device, including a processor and a memory. The memory is configured to store a computer program, and the processor is configured to call and run the computer program stored in the memory to execute the method in the first aspect.

A fourth aspect provides a chip, including a processor. The processor is configured to call and run a computer program in a memory to enable a device installed with the chip to execute the method in the first aspect or each implementation mode thereof.

A fifth aspect provides a computer-readable storage medium, which is configured to store a computer program. The computer program enables a computer to execute the method in the first aspect or each implementation mode thereof.

A sixth aspect provides a computer program product, which includes a computer program instruction. The computer program instruction enables a computer to execute the method in the first aspect or each implementation mode thereof.

A seventh aspect provides a computer program. The computer program, when run in a computer, enables the computer to execute the method in the first aspect or each implementation mode thereof.

According to the technical solutions in the embodiments of the disclosure, in the case that an SL BSR is triggered by an event, an SR may still be triggered under certain conditions. In this way, the problem in the related art that the SR is not triggered when the BSR event is triggered is avoided, thereby sending the SR as quickly as possible and reducing delay of sidelink data having high delay requirements.

BRIEF DESCRIPTION OF THE DRAWINGS

FIG. 3 is a schematic flowchart 1 of a method for information transmission according to an embodiment of the disclosure.

FIG. 4 is a schematic flowchart 2 of a method for information transmission according to an embodiment of the disclosure.

FIG. 5 is a schematic flowchart 3 of a method for information transmission according to an embodiment of the disclosure.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

Figure 1:
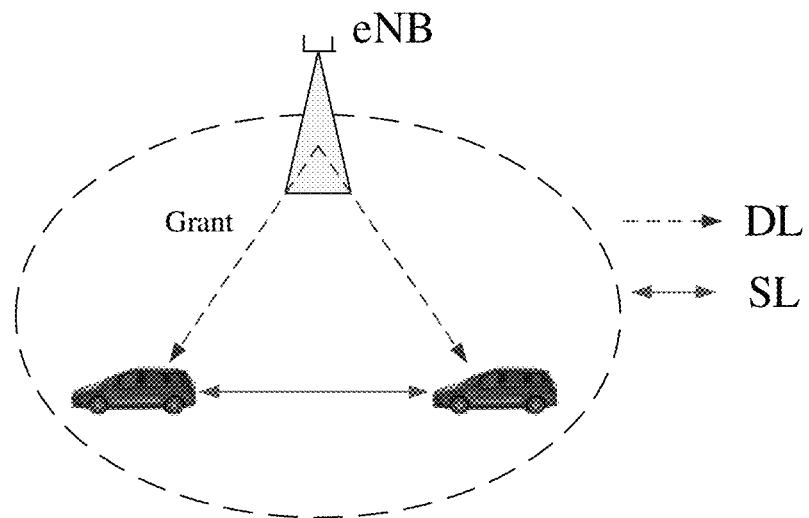
FIG. 1 is a schematic diagram 1 of a D2D communication system architecture according to an embodiment of the disclosure.
Figure 2:
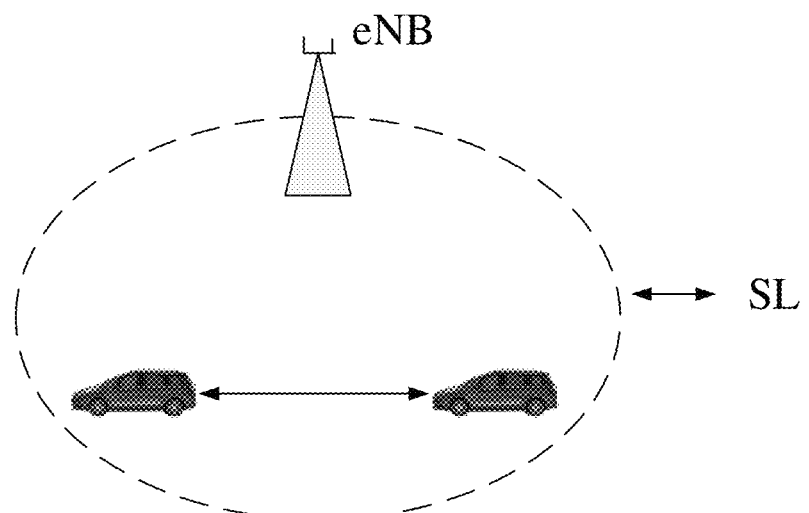
FIG. 2 is a schematic diagram 2 of a D2D communication system architecture according to an embodiment of the disclosure.

The solutions according to the embodiments of the disclosure may be applied to an Internet of Vehicles system provided in FIG. 1 and FIG. 2. The Internet of Vehicles system is an SL transmission technology based on LTE-D2D, with a higher spectrum efficiency and a shorter transmission delay. In the 3GPP Rel-14, the V2X technology is standardized, and two transmission modes are defined: a mode 3 and a mode 4. In the mode 3, as illustrated in FIG. 1, transmission resources of a terminal device, i.e., a vehicle-mounted terminal, are allocated by a base station, the vehicle-mounted terminal transmits data on a sidelink according to the resources allocated by the base station, and the base station may allocate single transmission resources for the terminal or semi-static transmission resources for the terminal. In the mode 4, as illustrated in FIG. 2, a vehicle-mounted terminal adopts a sensing and reservation transmission mode. The vehicle-mounted terminal acquires an available transmission resource set in a resource pool in a sensing manner, and randomly selects from this set, one resource for data transmission.

It is to be understood that the term "system" or "network" in the disclosure may usually be exchanged in the disclosure. In the disclosure, the term "and/or" is only an association relationship describing associated objects and represents that three relationships may exist. For example, A and/or B may represent three cases: i.e., independent existence of A, existence of both A and B and independent existence of B. In addition, the character "/" in the disclosure usually represents that previous and next associated objects form an "or" relationship.

The embodiment of the disclosure provides a method for information transmission applied to a terminal device. As illustrated in FIG. 3, the method includes the following operations.

In 21, if an SL BSR is triggered by an event, and if a first condition is met, at least one of the following operations is performed.

An SR is triggered.

A first uplink channel including the SR is transmitted.

BSR packeting is performed. The BSR at least includes the SL BSR.

A second uplink channel including the packeted BSR is transmitted.

That is, in the case that the first condition is met, the triggered SL BSR event may further trigger the SR, and/or transmit an uplink channel including the SR.

When the first condition is met, only BSR packeting may be performed. It should be pointed out that execution of the BSR packeting may be execution of Media Access Control Protocol Data Unit (MAC PDU) packeting that at least includes the SL BSR and then a data packet including the SL BSR is transmitted on the second uplink channel, or execution of the BSR packeting may also include execution of MAC PDU packeting that includes an SL BSR and an UpLink BSR (UL BSR), and then a data packet including the SL BSR and the UL BSR is transmitted on the second uplink channel.

There is also a case, that is, when the first condition is met, an SR may be triggered and BSR packeting may also be performed. Correspondingly, both the first uplink channel including the SR and the second uplink channel including the packeted BSR may be transmitted.

The first uplink channel may be a Physical Uplink Control Channel (PUCCH) or Physical Uplink Shared Channel (PUSCH), and the second uplink channel may be a PUSCH.

That is, in the case that a terminal device has triggered the SL BSR event, if the first condition is met, an SR may be triggered and/or BSR packeting may be performed. Further, if the SR is triggered, a PUCCH including SR information may be transmitted, and/or if BSR packeting is performed, a UL PUSCH including the BSR may be transmitted.

The first condition includes at least one of the following.

The SL that triggers the SR and/or the BSR meets a second preset condition.

There are available uplink UL resources, and the available uplink UL resources meet a third preset condition.

That is, there may be several cases. In the case that the SL meets the second preset condition, an operation of triggering the SR and/or performing BSR packeting is executed.

Or, when there are available UL resources and the available UL resources meet the third preset condition, an operation of triggering the SR and/or performing BSR packeting may be executed.

Further, the second preset condition may include at least one of the following.

Quality of Service (QoS) of data of the SL that triggers the SR and/or the BSR meets a first requirement.

A logical channel including SL data and triggering the SR and/or the BSR meets a second requirement.

Specifically, the second preset condition is that a QoS requirement of sidelink data that triggers the SR/BSR meets a certain condition, and/or the second preset condition may also be that a logical channel including sidelink data and triggering the SR/BSR meets a certain configuration. The logical channel includes a logical channel configured to bear data and/or signaling.

In addition to that the sidelink needs to meet the second preset condition, UL resources need to meet the third preset condition.

The third preset condition includes at least one of the following.

Attribute requirements of UL resources are configured respectively for logical channels of different SLs.

Attribute requirements of UL resources are configured respectively for target addresses of different SLs.

That is, the third preset condition is configured separately for logical channels of different sidelinks, and/or the third preset condition is configured separately for target addresses of different sidelinks.

For a BSR, the third preset condition affects a priority order of Link Control Protocols (LCPs) and/or whether the BSR can be generated.

The method further includes the following operations.

When the SL that triggers the SR and/or the BSR meets the second preset condition and/or the UL resources meet the third preset condition, BSR transmission is performed in a priority order of a first LCP.

In the priority order of the first LCP, a transmission priority of a UL BSR is lower than a transmission priority of an SL BSR.

For instance, for a BSR, the second preset condition affects a priority order of LCPs. For example, when a QoS requirement of a sidelink that triggers the BSR meets a certain condition, an SL BSR is transmitted preferentially, and then a UL BSR is transmitted.

For a BSR, the third preset condition affects a priority order of LCPs. For example, when a QoS requirement of the sidelink that triggers the BSR meets a certain condition or the logical channel meets a certain configuration and UL resources meet the third preset condition, an SL BSR is transmitted preferentially, and then a UL BSR is transmitted.

That is, when the UL resources meet the third preset condition and/or the SL that triggers the BSR meets the second preset condition, a sequence of an SL BSR and a UL BSR may be adjusted.

It may be determined whether to trigger an SR and/or whether to packet a BSR based on the second preset condition and the third preset condition in the first condition, and BSR packeting may include packeting an SL BSR and/or a UL BSR. That is, when the SL that triggers the SR and/or the BSR meets the second preset condition and/or UL resources meet the third preset condition, BSR packeting is performed. In other words, it may be understood that BSR packeting is performed when the first condition is met.

Alternatively, it may be also included that when the SL that triggers the SR and/or the BSR meets the second preset condition and/or UL resources meet the third preset condition, the SR is not triggered, and/or the first uplink channel including the SR is not transmitted. In such case, it may be understood as performing no triggering of the SR and no transmission of the SR when the second preset condition and/or the third preset condition in the first condition is met, while BSR packeting may be performed and the packeted BSR is transmitted through the second uplink channel.

The foregoing mainly focuses on determining whether to trigger an SR and/or whether to perform BSR packeting. The following further explains whether to transmit the SR and/or the BSR.

When there is a conflicting UL transmission, it is determined whether to transmit the first uplink channel including the SR based on an attribute of a logical channel that triggers the SL BSR and/or an attribute of the conflicting UL transmission.

And/or when there is a conflicting UL transmission, it is determined whether to transmit the second uplink channel including the packeted BSR based on an attribute of a UL transmission including the SL BSR and/or an attribute of the conflicting UL transmission.

The UL transmission may include two cases: a data channel and/or a control channel.

The attribute is determined based on at least one of: transmitted content, an MAC Control Element (MAC CE) attribute included in the transmission, or an attribute of a logical channel of a data Radio Link Control PDU (RLC PDU) included in the transmission.

That is, for transmission of the SR/BSR, if there is a conflicting UL data transmission, it is determined whether to transmit the SR and/or whether to transmit the BSR according to an attribute of a logical channel that triggers the SL BSR and an attribute of conflicting UL data.

For the SR, mainly in correspondence with a control channel, content in the conflicting UL transmission or an attribute of the conflicting UL transmission are compared with the control channel to which the SR corresponds to determine which is important for transmission.

For the BSR, there is other content in a data channel, so that the content in the conflicting UL transmission is compared with the BSR, and is also compared with the other content in the data channel including the BSR.

Further, the conflicting UL transmission may be understood as a UL transmission that conflicts with a current transmission of an SR and/or a BSR to be transmitted. Therefore, it is necessary to compare an attribute of the transmission of the SR and/or the BSR to be transmitted with the attribute of the conflicting UL transmission.

Specifically, the content included in the transmission may specifically be at least one of Messaging 3 (MSG3) or Emergency.

In the MSG3 case, for example, the SR is not transmitted as long as UL data is MSG3. Alternatively, if the UL data is MSG3, and a UL transmission used for transmitting the SL BSR includes no MSG3, it is determined that the SL BSR is not transmitted. Or on the contrary, i.e., if the UL data includes no MSG3, and the UL transmission used for transmitting the SL BSR includes MSG3, it is determined that the SL BSR is transmitted.

In the Emergency case, for example, the SR is not transmitted as long as UL data is Emergency. Alternatively, if the UL data is Emergency, and a UL transmission for transmitting the SL BSR includes no Emergency, it is determined that the SL BSR is not transmitted. Or on the contrary, i.e., if the UL data includes no Emergency, and the UL transmission used for transmitting the SL BSR includes Emergency, it is determined that the SL BSR is transmitted.

An attribute of the UL transmission and/or the conflicting UL transmission may also be determined according to an MAC CE attribute.

The MAC CE attribute is determined based on at least one of the following: an attribute of an MAC CE itself, an attribute of a logical channel corresponding to the MAC CE when the MAC CE is a UL BSR, or an attribute of a logical channel corresponding to the MAC CE when the MAC CE is an SL BSR.

The attribute of the MAC CE is, for example, a Cell Radio Network Temporary Identifier MAC CE (C-RNTI MAC CE) or data from a UL Common Control Channel (UL-CCCH), and Configured Grant Confirmation MAC CE. Further, when the MAC CE attribute to which the attribute of the conflicting UL transmission corresponds is the above attribute, it is determined that the SL is not transmitted. Alternatively, when the attribute of the conflicting UL transmission is the above attribute, and an attribute of the UL transmission used for transmitting the SL BSR is not the above attribute, it is determined that the SL BSR is not transmitted. Otherwise, it is determined that the BSR is transmitted.

For another example, in the case of a Single Entry Power Headroom Report MAC CE (PHR MAC CE) or Multiple Entry PHR MAC CE, data of other logical channels except a UL-CCCH, an MAC CE for recommended bit rate query, and padding, when the MAC CE attribute to which the attribute of the conflicting UL transmission corresponds is the above attribute, it is determined that the SL is transmitted. Alternatively, when the attribute of the conflicting UL transmission is the above attribute, and an attribute of the UL transmission used for transmitting the SL BSR is not the above attribute, it is determined that the SL is not transmitted.

In addition, the attribute may also include a UL BSR. For example, an attribute of UL data is an attribute of a logical channel that triggers the UL BSR, that is, the attribute of the UL data in a conflicting UL transmission is determined based on an attribute of a logical channel that triggers the UL BSR. For instance, a priority of the logical channel or a QoS attribute of data in the logical channel may be included. Based on the comparison between the priority of the logical channel and a priority of a transmission corresponding to the SR, the one with the higher priority is transmitted. The transmission of the SL BSR is similar. Or a corresponding priority is determined based on the QoS attribute, and the one with the higher priority is transmitted.

The attribute may also include an SL BSR. For example, the attribute of the UL data is determined based on the attribute of the logical channel that triggers the SL BSR. Specific processing is the same as the foregoing, which are not elaborated herein.

In addition, the attribute may also include an attribute of a logical channel of a data RLC PDU included in the transmission, i. e., a UL data RLC PDU. For example, the attribute of the UL data is the attribute of the logical channel of the data RLC PDU. For example, if a priority of data included in the UL data is low, a conflicting UL transmission is not transmitted, while an SR and/or a BSR is transmitted.

Comparison of the QoS attribute may be based on a pre-configured attribute list, or a priority is lower than a threshold or lower than a priority of a data/logical channel (group) that triggers an SL BSR event.

The method further includes the following operations.

When an SR is mapped to at least one of a UL logical channel and an SL logical channel and the SR is triggered by the UL logical channel, it is determined whether to transmit the first uplink channel including the SR based on whether the SR is triggered by the at least one of the UL logical channel and the SL logical channel.

When the SR is mapped to at least one of at least two SL logical channels, it is determined whether to transmit the first uplink channel including the SR and/or whether to transmit the second uplink channel including the packeted BSR based on whether the SR and/or the BSR is triggered by the at least one of the at least two SL logical channels.

At least one of the UL logical channel and the SL logical channel is the UL logical channel, or the SL logical channel, or the UL logical channel and the SL logical channel.

That is, if the SR is mapped to the SL logical channel and the UL logical channel and the SR is triggered by the UL logical channel, an attribute of the UL logical channel that triggers the SR is considered to determine whether to transmit the SR.

As long as one of the UL logical channel or the SL logical channel triggers the SR, the SR is triggered. Further, for instance, when there is a UL transmission that conflicts with the transmission of the SR, the determination may be made in combination with the above conditions respectively for the UL logical channel and the SL logical channel that trigger the SR, which are not elaborated herein.

Alternatively, only when both the UL logical channel and the SL logical channel trigger the SR, the SR is triggered. Further, for instance, when there is a UL transmission that conflicts with the transmission of the SR, the determination may be made in combination with the above conditions, which are not elaborated herein.

At least one of the at least two SL logical channels includes one of the following: one of the at least two SL logical channels, i.e., any one of the at least two SL logical channels; a first SL logical channel of the at least two SL logical channels, which may be an SL logical channel with a highest priority among the at least two SL logical channels; or, all of the at least two SL logical channels.

If the SR is mapped to multiple SL logical channels, attributes of the multiple SL logical channels mapped to the SR are separately considered to determine whether to transmit the SR and/or the BSR.

As long as one of multiple SL logical channels triggers the SR and/or the BSR, the SR and/or the BSR is triggered.

As long as a logical channel with a highest priority among the multiple SL logical channels triggers the SR and/or the BSR, the SR and/or the BSR is triggered.

Only when all of the multiple SL logical channels trigger the SR and/or the BSR, the SR and/or the BSR is triggered.

Further, for example, when there is a UL transmission that conflicts with transmission of the SR and/or the BSR, the determination may be made in combination with the above conditions respectively for at least one of SL logical channels that trigger the SR and/or the BSR, which are not elaborated herein.

In addition to that there may be conflicting UL transmissions, there may also be SL conflicting. Therefore, the method provided in this embodiment further includes the following operations.

It is determined whether to transmit the first uplink channel including the SR and/or whether to transmit the second uplink channel including the packeted BSR based on whether there is conflicting SL data.

Transmission of the first uplink channel including the SR and/or transmission of the second uplink channel including the packeted BSR is triggered when there is no conflicting SL data.

When there is a conflicting SL data transmission, it is determined whether to transmit the first uplink channel including the SR and/or whether to transmit the second uplink channel including the packeted BSR based on QoS attribute corresponding to the SL data. For instance, if a priority of the QoS attribute of data included in the SL data is low, it may be determined to transmit the SR and/or the BSR. Otherwise, the SL data is transmitted.

Comparison of the QoS attribute may be based on a pre-configured attribute list, or a priority is lower than a threshold or lower than a priority of a data/logical channel (group) that triggers the SL BSR event.

The data/logical channel (group) that triggers the SL BSR event may be Data Radio Bearer (DRB) data or Signaling Radio Bearer (SRB) data.

Based on the foregoing solutions, the embodiment provides the following examples.

In Example 1, referring to FIG. 4, determining whether to trigger an SR and/or whether to packet a BSR is described as follows.

Firstly, it is determined whether data that triggers a sidelink SR/BSR is data with a high priority/high QoS requirement.

Then, it is determined whether uplink channel resources used to transmit the SR and/or the BSR meet requirements for bearing data with a high priority or high QoS requirement.

Then, it is determined to trigger the SR.

When it is determined that the data that triggers the sidelink SR/BSR is data with a high priority/high QoS requirement, the SR is triggered or BSR packeting is performed preferentially.

On the one hand, to determine whether the data that triggers the sidelink SR/BSR is data with a high priority/ high QoS requirement, the following conditions are provided.

The second preset condition is that QoS requirements of data of the sidelink that triggers the SR/BSR meet a certain condition. For example, a priority of the sidelink is higher than a threshold, or a delay requirement is lower than a threshold, or a reliability requirement is higher a threshold.

The second preset condition is that a logical channel including sidelink data and triggering the SR/BSR meets a certain configuration. For example, the configuration of the sidelink logical channel indicates that data of the logical channel requires corresponding special processing.

On the other hand, in addition to determining whether the data that triggers the sidelink SR/BSR is data with a high priority/high QoS requirement, it is also determined whether the uplink channel resources used for transmitting the SR/BSR meet requirements for bearing data with a high priority or high QoS requirement.

The uplink channel resources may be an attribute of a PUSCH or an attribute of a PUCCH for an SR, and may be an attribute of a PUSCH for a BSR.

The attribute may be a time attribute (for example, length) of a PUCCH/PUSCH, a numerology, a type suitable for configured grant, and a type suitable for a carrier.

Different attribute requirements for uplink channel resources may be configured for different sidelink logical channels and/or different sidelink target addresses, respectively.

For some special PUSCHs, such as the above conflicting UL transmissions, corresponding attributes of the UL transmissions may be determined according to MSG3 for random access or a PUSCH for an emergency PDU to determine whether the UL transmissions may be transmitted preferentially.

For an SR, a main issue is whether to transmit the SR. For a BSR, in addition to whether to transmit the BSR, there is also an issue for determining the order in which an LCP is performed. That is, when certain conditions are met, a sidelink BSR may be packeted before the following data:

MAC control element for C-RNTI or data from UL-CCCH (an MAC CE including a C-RNTI or data from a UL-CCCH), MAC control element for DPR (an MAC CE including a DPR), MAC control element for SPS confirmation (an MAC CE including SPS confirmation), MAC control element for AUL confirmation (an MAC CE including AUL confirmation), MAC control element for BSR, with exception of BSR included for padding (an MAC CE including a BSR, with BSR including no padding), and MAC control element for PHR, Extended PHR, or Dual Connectivity PHR (an MAC CE including a PHR, an extended PHR or a dual connectivity PHR).

In Example 2, referring to FIG. 5, when there is conflicting with other UL PUSCHs, it is required to decide whether to transmit an SR PUCCH/PUSCH including an SL BSR. A main issue is how to compare attributes of different objects.

An attribute of the SR PUCCH is from an attribute of a logical channel/data that triggers the SR.

When the SR PUCCH is triggered only by an SL BSR, the attribute of the SR PUCCH is determined only based on the attribute of the logical channel/data that triggers the SL BSR (a highest/lowest value is taken if there are multiple logical channels/data).

When the SR PUCCH is triggered only by an SL BSR and a UL BSR, the attribute of the SR PUCCH is determined based on the attribute of the logical channel/data that triggers the SL BSR and an attribute of a logical channel/data that triggers the UL BSR (a highest/lowest value is taken if there are multiple logical channels/data).

An attribute of the PUSCH is determined based on attributes of other contents/data included in the PUSCH.

For the SL BSR, the attribute of the SL BSR is determined only based on the attribute of the logical channel/data that triggers the SL BSR (a highest/lowest value is taken if there are multiple logical channels/data).

For other data included in the PUSCH, an attribute of an MAC CE is from an attribute of the logical channel/data that triggers the SL BSR, or the attribute of the MAC CE is determined based on an attribute of a logical channel/data associated with the MAC CE, for example, a UL BSR, or the attribute of the MAC CE is determined directly based on the attribute of the MAC CE itself, for example, a C-RNTI.

For a subPDU from a DRB/SRB, an attribute of the subPDU is determined based on an attribute of an associated logical channel/data.

A highest/lowest value is taken if there are multiple contents.

Attributes of different objects may be compared directly. For example, a priority of a data/logical channel of a sidelink and a priority of a data/logical channel of an uplink are compared directly.

Alternatively, the attributes of the different objects may be compared indirectly. For example, a priority of a data/logical channel of a sidelink is compared with a first threshold, a priority of a data/logical channel of an uplink is compared with a second threshold, and a final sequence is as follows: 1, the uplink higher than the second threshold; 2, the sidelink higher than the first threshold; 3, the uplink lower than the second threshold; and 4, the sidelink lower than the second threshold.

The attributes herein generally refer to attributes of various binary/polynary logical channels. For example, one logical channel may be divided into two types. Type one needs to be processed preferentially or corresponds to a polynary value, and a larger or smaller value indicates a high priority.

The SR PUCCH may be a PUCCH including, but not limited to, SR information.

An attribute of the data/logical channels and the threshold may be from a high-layer instruction, network configuration, or pre-configuration.

The logical channels include a logical channel configured to bear data and/or signaling.

Figure 6:
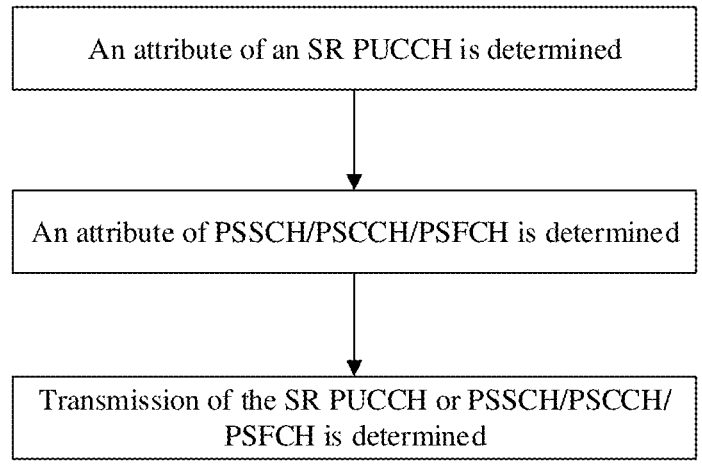
FIG. 6 is a schematic flowchart 4 of a method for information transmission according to an embodiment of the disclosure.

In Example 3, referring to FIG. 6, when there is conflicting with other SL Physical Sidelink Control Channels (PSCCHs)/Physical Sidelink Shared Channels (PSSCHs)/Physical Sidelink Feedback Channels (PSFCHs), it is required to decide whether to transmit an SR PUCCH/a PUSCH including an SL BSR. An issue of determining an attribute of an SL channel is described.

For a PSCCH/PSSCH, the attribute of the PSCCH/PSSCH is determined based on attributes of data/logical channels included therein.

For a PSFCH, the attribute of the PSFCH is determined based on an attribute included in the PSFCH.

The attributes herein generally refer to attributes of various binary/polynary logical channels. For example, one logical channel may be divided into two types. Type one needs to be processed preferentially or corresponds to a polynary value, and a larger or smaller value indicates a high priority.

The SR PUCCH may be a PUCCH including, but not limited to, SR information.

An attribute of the data/logical channels and the threshold may be from a high-layer instruction, network configuration, or pre-configuration.

The logical channels include a logical channel configured to bear data and/or signaling.

Through the above solutions, in the case that an SL BSR is triggered by an event, an SR may still be triggered under certain conditions. In this way, the problem in the related art that the SR is not triggered when the BSR event is triggered is avoided, thereby sending the SR as quickly as possible and reducing delay of sidelink data having high delay requirements.

In addition, in the solutions provided in the embodiment, an SL BSR may be triggered before a UL BSR under certain conditions, which is beneficial to reduce delay of sidelink data with high delay requirements.

Finally, in the embodiment, the QoS attribute of the SL is considered in the SL SR/BSR transmission mechanism, and thus this is beneficial to reduce the delay of the sidelink data with high delay requirements.

Figure 7:
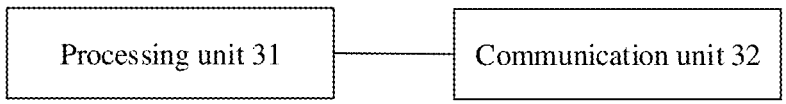
FIG. 7 is a composition structure diagram of a terminal device according to an embodiment of the disclosure.

An embodiment of the disclosure provides a terminal device. As illustrated in FIG. 7, the terminal device includes a processing unit 31.

If an SL BSR is triggered by an event, and if a first condition is met, the processing unit 31 is configured to perform at least one of the following: triggering an SR; transmitting a first uplink channel including the SR; performing BSR packeting, with the BSR at least including the SL BSR; or, transmitting a second uplink channel including the packeted BSR.

The first uplink channel may be a PUCCH or PUSCH, and the second uplink channel may be a PUSCH.

That is, in the case that the terminal device has triggered the SL BSR event, if the first condition is met, an SR may be triggered and/or BSR packeting may be performed. Further, if the SR is triggered, a PUCCH including SR information may be transmitted, and/or if BSR packeting is performed, a UL PUSCH including a BSR may be transmitted.

The first condition includes at least one of the following.

The SL that triggers the SR and/or the BSR meets a second preset condition.

There are available uplink UL resources, and the available uplink UL resources meet a third preset condition.

Further, the second preset condition may include at least one of the following.

QoS of data of the SL that triggers the SR and/or the BSR meets a first requirement.

A logical channel including SL data and triggering the SR and/or the BSR meets a second requirement.

Further, in addition to that the sidelink needs to meet the second preset condition, UL resources need to meet the third preset condition.

The third preset condition includes at least one of the following.

Attribute requirements of UL resources are configured respectively for logical channels of different SLs.

Attribute requirements of UL resources are configured respectively for target addresses of different SLs.

That is, the third preset condition is configured separately for logical channels of different sidelinks, and/or the third preset condition is configured separately for target addresses of different sidelinks.

For a BSR, the third preset condition affects a priority order of LCPs and/or whether the BSR can be generated.

The terminal device further includes a communication unit 32.

The communication unit 32 is configured to perform BSR transmission.

The processing unit 31 is configured to, when the SL that triggers the SR and/or the BSR meets the second preset condition and/or the UL resources meet the third preset condition, perform the BSR transmission in a priority order of a first LCP.

In the priority order of the first LCP, a transmission priority of a UL BSR is lower than a transmission priority of an SL BSR.

For instance, for a BSR, the second preset condition affects a priority order of LCPs. For example, when a QoS requirement of a sidelink that triggers the BSR meets a certain condition, an SL BSR is transmitted preferentially, and then a UL BSR is transmitted.

For a BSR, the third preset condition affects a priority order of LCPs. For example, when a QoS requirement of the sidelink that triggers the BSR meets a certain condition or the logical channel meets a certain configuration and UL resources meet the third preset condition, an SL BSR is transmitted preferentially, and then a UL BSR is transmitted.

That is, when the UL resources meet the third preset condition and/or the SL that triggers the BSR meets the second preset condition, a sequence of an SL BSR and a UL BSR may be adjusted.

The foregoing mainly focuses on determining whether to trigger an SR and/or whether to perform BSR packeting. The following further explains whether to transmit the SR and/or the BSR.

The processing unit 31 is configured to, when there is a conflicting UL transmission, determine whether to transmit the first uplink channel including the SR based on an attribute of a logical channel that triggers the SL BSR and/or an attribute of the conflicting UL transmission.

And/or, the processing unit 31 is configured to, when there is a conflicting UL transmission, determine whether to transmit the second uplink channel including the packeted BSR based on an attribute of a UL transmission including the SL BSR and/or an attribute of the conflicting UL transmission.

Further, the conflicting UL transmission may be understood as a UL transmission that conflicts with a current transmission of an SR and/or a BSR to be transmitted. Therefore, it is necessary to compare an attribute of the transmission of the SR and/or the BSR to be transmitted with the attribute of the conflicting UL transmission.

Specifically, content included in the transmission may specifically be MSG3 and Emergency.

An attribute of the UL transmission may also be determined based on an MAC CE attribute.

The MAC CE attribute is determined based on at least one of the following: an attribute of an MAC CE itself, an attribute of a logical channel corresponding to the MAC CE when the MAC CE is a UL BSR, or an attribute of a logical channel corresponding to the MAC CE when the MAC CE is an SL BSR.

The processing unit 31 is configured to perform at least one of the following operations.

When an SR is mapped to at least one of a UL logical channel and an SL logical channel and the SR is triggered by the UL logical channel, the processing unit 31 determines whether to transmit the first uplink channel including the SR based on whether the SR is triggered by the at least one of the UL logical channel and the SL logical channel.

When the SR is mapped to at least one of at least two SL logical channels, the processing unit 31 determines whether to transmit the first uplink channel including the SR and/or whether to transmit the second uplink channel including the packeted BSR based on whether the SR and/or the BSR is triggered by the at least one of the at least two SL logical channels.

At least one of the UL logical channel and the SL logical channel is the UL logical channel, or the SL logical channel, or the UL logical channel and the SL logical channel.

At least one of the at least two SL logical channels includes one of the following: one of the at least two SL logical channels, i.e., any one of the at least two SL logical channels; a first SL logical channel of the at least two SL logical channels, which may be an SL logical channel with a highest priority among the at least two SL logical channels; or, all of the at least two SL logical channels.

The processing unit 31 determines whether to transmit the first uplink channel including the SR and/or whether to transmit the second uplink channel including the packeted BSR based on whether there is conflicting SL data.

The processing unit 31 triggers transmission of the first uplink channel including the SR and/or transmission of the second uplink channel including the packeted BSR when there is no conflicting SL data.

The processing unit 31 determines, when there is a conflicting SL data transmission, whether to transmit the first uplink channel including the SR and/or whether to transmit the second uplink channel including the packeted BSR based on a QoS attribute corresponding to the SL data.

The QoS attribute belongs to a pre-configured attribute list, a priority is lower than a threshold or lower than a priority of a data/logical channel (group) that triggers the SL BSR event.

The data/logical channel (group) that triggers the SL BSR event may be DRB data or SRB data.

Through the above solutions, in the case that an SL BSR is triggered by an event, an SR may still be triggered under certain conditions. In this way, the problem in the related art that the SR is not triggered when the BSR event is triggered is avoided, thereby sending the SR as quickly as possible and reducing delay of sidelink data having high delay requirements.

In addition, in the solutions provided in the embodiment, an SL BSR may be triggered before a UL BSR under certain conditions, which is beneficial to reduce delay of sidelink data with high delay requirements.

Finally, in the embodiment, the QoS attribute of the SL is considered in the SL SR/BSR transmission mechanism, and thus this is beneficial to reduce the delay of the sidelink data with high delay requirements.

Figure 8:
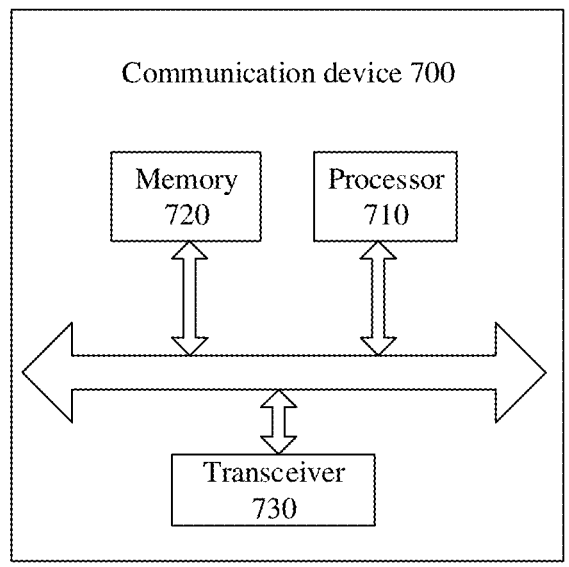
FIG. 8 is a composition structure diagram of a communication device according to an embodiment of the disclosure.

FIG. 8 is a schematic structure diagram of a communication device 700 according to an embodiment of the disclosure. The communication device in this embodiment may specifically be a terminal device in the foregoing embodiments. The communication device 700 illustrated in FIG. 8 includes a processor 710, and the processor 710 may call and run a computer program in a memory to implement the method in the embodiments of the disclosure.

In one example, as illustrated in FIG. 8, the communication device 700 may further include a memory 720. The processor 710 may call and run the computer program in the memory 720 to implement the method in the embodiments of the disclosure.

The memory 720 may be a separate device independent of the processor 710 and may also be integrated into the processor 710.

In one example, as illustrated in FIG. 8, the communication device 700 may further include a transceiver 730. The processor 710 may control the transceiver 730 to communicate with another device, specifically sending information or data to the other device or receiving information or data sent by the other device.

The transceiver 730 may include a transmitter and a receiver. The transceiver 730 may further include antennae, and the number of the antennae may be one or more.

In one example, the communication device 700 may specifically be a terminal device in the embodiment of the disclosure, and the communication device 700 may implement corresponding flows implemented by a mobile terminal/terminal device in each method of the embodiments of the disclosure. For simplicity, elaborations are omitted herein.

Figure 9:
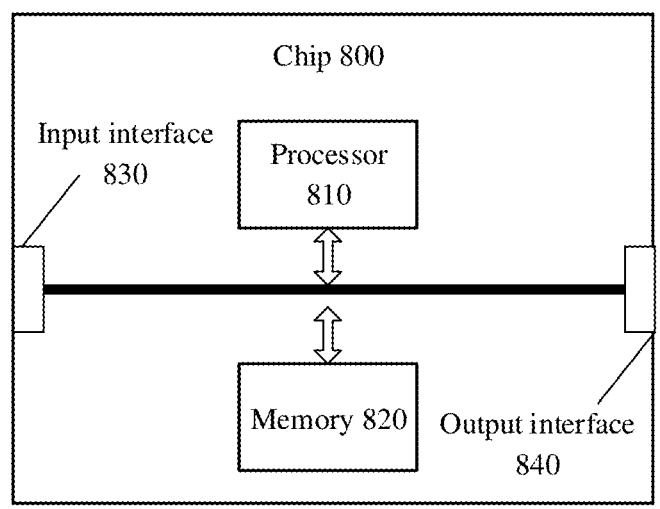
FIG. 9 is a schematic block diagram of a chip according to an embodiment of the disclosure.

FIG. 9 is a schematic structure diagram of a chip according to an embodiment of the disclosure. The chip 800 illustrated in FIG. 9 includes a processor 810, and the processor 810 may call and run a computer program in a memory to implement the method in the embodiments of the disclosure.

In one example, as illustrated in FIG. 9, the chip 800 may further include a memory 820. The processor 810 may call and run the computer program in the memory 820 to implement the method in the embodiments of the disclosure.

The memory 820 may be a separate device independent of the processor 810 and may also be integrated into the processor 810.

In one example, the chip 800 may further include an input interface 830. The processor 810 may control the input interface 830 to communicate with another device or chip, specifically acquiring information or data sent by the other device or chip.

In one example, the chip 800 may further include an output interface 840. The processor 810 may control the output interface 840 to communicate with the other device or chip, specifically outputting information or data to the other device or chip.

In one example, the chip may be applied to the terminal device in the embodiments of the disclosure, and the chip may implement corresponding flows implemented by the terminal device in each method of the embodiments of the disclosure. For simplicity, elaborations are omitted herein.

It is to be understood that the chip mentioned in the embodiments of the disclosure may also be called a system-level chip, a system chip, a chip system, or a system on chip, etc.

It is to be understood that the processor in the embodiments of the disclosure may be an integrated circuit chip and has a signal processing capability. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the method in combination with hardware.

It can be understood that the memory in the embodiments of the disclosure may be a volatile memory or a nonvolatile memory, or may include both the volatile and nonvolatile memories. The nonvolatile memory may be an ROM, a PROM, an EPROM, an EEPROM, or a flash memory. The volatile memory may be an RAM, which is used as an external cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include, but not limited to, memories of these and any other proper types.

The embodiments of the disclosure also provide a computer-readable storage medium, which is configured to store a computer program.

In one example, the computer-readable storage medium may be applied to a network device in the embodiments of the disclosure, and the computer program enables a computer to execute corresponding flows implemented by the network device in each method of the embodiments of the disclosure. For simplicity, elaborations are omitted herein.

In one example, the computer-readable storage medium may be applied to a terminal device in the embodiments of the disclosure, and the computer program enables a computer to execute corresponding flows implemented by the mobile terminal/terminal device in each method of the embodiments of the disclosure. For simplicity, elaborations are omitted herein.

The embodiments of the disclosure also provide a computer program product, which includes a computer program instruction.

In one example, the computer program product may be applied to a network device in the embodiments of the disclosure, and the computer program instruction enables a computer to execute corresponding flows implemented by the network device in each method of the embodiments of the disclosure. For simplicity, elaborations are omitted herein.

In one example, the computer program product may be applied to a mobile terminal/terminal device in the embodiments of the disclosure, and the computer program instruction enables the computer to execute corresponding flows implemented by the mobile terminal/terminal device in each method of the embodiments of the disclosure. For simplicity, elaborations are omitted herein.

The embodiments of the disclosure also provide a computer program.

In one example, the computer program may be applied to a network device in the embodiments of the disclosure, and the computer program runs in a computer to enable the computer to execute corresponding flows implemented by the network device in each method of the embodiments of the disclosure. For simplicity, elaborations are omitted herein.

In one example, the computer program may be applied to a mobile terminal/terminal device in the embodiments of the disclosure, and the computer program runs in the computer to enable the computer to execute corresponding flows implemented by the mobile terminal/terminal device in each method of the embodiments of the disclosure. For simplicity, elaborations are omitted herein.

Those of ordinary skill in the art may realize that the units and algorithm operations of each example described in combination with the embodiments disclosed in the disclosure may be implemented by electronic hardware or a combination of computer software and the electronic hardware. Whether the functions are performed by hardware or software depends on particular applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiments and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, each functional unit in each embodiment of the disclosure may be integrated into a processing unit, each unit may also physically exist independently, and two or more than two units may also be integrated into a unit.

When being realized in a form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk, or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for information transmission, applied to a terminal device, the method comprising:
   when a sidelink (SL) Buffer Status Report (BSR) is triggered by an event, and when a first condition is met, performing the following:
   triggering a scheduling request (SR);
   transmitting a first uplink channel comprising the SR;
   wherein the first condition comprises SL data that triggers the SR meets a second preset condition, and the second preset condition comprises a priority of the SL data that triggers the SR is higher than a threshold;
   wherein the method further comprises:
   when there is a conflicting UL transmission, determining whether to transmit the first uplink channel comprising the SR based on an attribute of a logical channel that triggers the SL BSR and an attribute of the conflicting UL transmission, the attribute being determined based on an attribute of a logical channel of a data Radio Link Control Protocol Data Unit (RLC PDU) included in the conflicting UL transmission.

2. The method according to claim 1, further comprising:
   determining whether to transmit the first uplink channel comprising the SR based on whether there is conflicting SL data.

3. The method according to claim 2, wherein determining whether to transmit the first uplink channel comprising the SR based on whether there is conflicting SL data comprises at least one of the following:
   triggering transmission of the first uplink channel comprising the SR when there is no conflicting SL data; or
   determining, when there is conflicting SL data, whether to transmit the first uplink channel comprising the SR based on a Quality of Service (QOS) attribute corresponding to the SL data.

4. The method according to claim 2, wherein when a priority of QoS corresponding to the SL data is low, it is determined to transmit the SR, and when the priority of the QoS corresponding to the SL data is high, it is determined to transmit the SL data.

5. The method according to claim 4, wherein the low priority of the QoS indicates that the priority of the QoS is lower than a threshold.

6. A terminal device, comprising:
   a processor, configured to, when a sidelink (SL) Buffer Status Report (BSR) is triggered by an event, and when a first condition is met, perform the following:
   triggering a scheduling request (SR);
   transmitting a first uplink channel comprising the SR;
   wherein the first condition comprises SL data that triggers the SR meets a second preset condition, and the second preset condition comprises a priority of the SL data that triggers the SR is higher than a threshold;
   wherein the processor is configured to:
   when there is a conflicting UL transmission, determine whether to transmit the first uplink channel comprising the SR based on an attribute of a logical channel that triggers the SL BSR and an attribute of the conflicting UL transmission, the attribute being determined based on an attribute of a logical channel of a data Radio Link Control Protocol Data Unit (RLC PDU) included in the conflicting UL transmission.

7. The terminal device according to claim 6, wherein the processor is configured to:
   determine whether to transmit the first uplink channel comprising the SR based on whether there is conflicting SL data.

8. The terminal device according to claim 7, wherein the processor is configured to perform at least one of the following:
   triggering transmission of the first uplink channel comprising the SR when there is no conflicting SL data; or
   determining, when there is conflicting SL data, whether to transmit the first uplink channel comprising the SR based on a Quality of Service (QOS) attribute corresponding to the SL data.

9. The terminal device according to claim 7, wherein the processor is configured to determine to transmit the SR when a priority of QoS corresponding to the SL data is low, and determine to transmit the SL data when the priority of the QoS corresponding to the SL data is high.

10. The terminal device according to claim 9, wherein the low priority of the QoS indicates that the priority of the QoS is lower than a threshold.

* * * * *